United States Patent [19]
Burek et al.

[11] Patent Number: 5,450,518
[45] Date of Patent: Sep. 12, 1995

[54] OPTICAL FIBER CABLE SPLICE CLOSURE

[75] Inventors: Denis E. Burek, Cumming; Gary S. Cobb, Norcross; George E. Mock, Duluth; Daniel A. Porteous, Augusta, all of Ga.

[73] Assignee: AT&T Corp., Murray Hill, N.J.

[21] Appl. No.: 322,832

[22] Filed: Oct. 13, 1994

[51] Int. Cl.$^6$ ............................................. G02B 6/40
[52] U.S. Cl. ............................................. 385/135
[58] Field of Search .................. 385/53, 134, 135, 137, 385/138

[56] References Cited

U.S. PATENT DOCUMENTS

| | | | |
|---|---|---|---|
| 4,332,435 | 6/1982 | Post | 350/96.2 |
| 4,538,021 | 8/1985 | Williamson, Jr. | 174/92 |
| 4,679,896 | 7/1987 | Krafcik et al. | 350/96.2 |
| 5,097,529 | 3/1992 | Cobb et al. | 385/135 |
| 5,274,731 | 12/1993 | White | 385/137 |
| 5,278,933 | 1/1994 | Hunsinger et al. | 385/135 |
| 5,313,546 | 5/1994 | Toffetti | 385/135 |
| 5,323,478 | 6/1994 | Milanowski et al. | 385/135 |
| 5,329,067 | 7/1994 | Abe et al. | 385/135 |
| 5,341,451 | 8/1994 | Latte et al. | 385/135 |

Primary Examiner—Rodney B. Bovernick
Assistant Examiner—Robert E. Wise

[57] ABSTRACT

A splice closure for optical fiber cables has an outer two pan shell, an interior longitudinally extending spine member held within the shell and cable sheath gripping members mounted on the ends of the spine member. A splice tray is removably mounted on the spine member intermediate its ends, and a plurality of splice holders are stacked on the splice tray. Each splice holder has grooves for containing the individual splices and means for affixing the individual splices to the holder. A splice tray cover contains means for applying compressive force to the stack of holders to hold them in place on the splice tray.

15 Claims, 9 Drawing Sheets

OPTICAL FIBER CABLE SPLICE CLOSURE

FIELD OF THE INVENTION

This invention relates to optical fiber cable splice closures and, more particularly, to a splice closure of relatively small size which is capable of containing a number of optical fiber splices, and which is both low in cost and economical in installation and maintenance.

BACKGROUND OF THE INVENTION

The use of optical fibers for signal transmission, both broadband and narrow band, is more and more becoming the dominant signal transmission mode in communications. The bandwidth characteristics of optical fibers, as well as their relative immunity to certain types of interference and contaminants make them a highly desirable transmission medium in high capacity trunk lines as well as in lower capacity feeder and distribution lines.

Individual optical fibers, regardless of end use, are generally combined in an optical fiber cable which contains a plurality of glass fibers, each of which is protected by at least one layer of a coating material. Generally, the optical fibers are assembled into units which are held together by binder ribbons or tubes to form a cable core. The core is enclosed by either a plastic or a plastic and metallic tube and a plastic jacket. Instead of bunched individual fibers, the core tube may contain optical fiber containing ribbons.

Regardless of the cable composition, it is necessary that lengths of fiber cable be spliced at their ends to corresponding lengths of fiber cable or to other optical fibers, which entails splicing each of the individual fibers in a cable to its corresponding fiber in the adjoining cable. To this end, there is provided a splice closure arrangement, usually comprising a protective case which contains, for example, a splice tray and a plurality of splice holders mounted thereon into which the encased splices are inserted and held. The cables are entrant into the case and generally are clamped at each end of the case to reduce or eliminate the effect of tensile forces on the cables and the splices. It is generally necessary that sufficient amounts of fiber slack be provided within the case, such as, for example, half a meter of fiber length so that the individual fibers can be pulled clear of the closure case for preparation of the ends and for splicing and, also, at least in some cases, to absorb tensile forces. For a multifiber cable there should be, within the closure case, an arrangement for positioning and storing the slack and for keeping the fibers arranged in an orderly manner. Because of the delicate and somewhat brittle nature of the individual glass fibers, they cannot be crimped or bent to too small a radius. Thus, it becomes necessary to provide storage facilities for the slack fiber that minimize fiber bending, at least bending which involves small radius bends. U.S. Pat. Nos. 5,097,529 of Cobb et al.; 4,679,896 of Krafcik et al. and 4,332,435 of Post are illustrative of prior art arrangements addressing the problem of both splice and fiber slack storage.

Typically, prior art splice closures are somewhat complex, difficult to use and to access, and necessarily are bulky. As a consequence, they are not economical when used for splicing relatively low count optical fiber cables, such as, for example, drop cables or CATV applications. Also, when used for low count cables, their bulkiness makes it difficult to provide adequate storage room in cases where small pedestals are used, for example, without sacrificing accessibility. In addition, closure re-entry is more often than not difficult and time consuming. Some prior art closures contain fiber and splice organizers which place higher than desired stresses on the fibers, while others fail to provide adequate storage for the fiber slack. For example, a splice closure may have a central transverse bulkhead to which the fibers and splices are attached, and to which the fibers are directed with a minimum of slack. Such an arrangement can be susceptible to tensile force damage. In other arrangements, all of the fibers are looped within a retainer or the fiber slack is stored on spools. In either case, identification, repair, or splicing is made difficult and attempts to rearrange the fibers can result in too sharp bends causing increased signal attenuation or in possible fiber cracking. In high count cable splicing, these factors are not as important inasmuch as entry into the splice closure is seldom necessary. With low count drop or distribution cables, however, entry to add or remove splices is a frequent occurrence, hence a splice closure which provides both easy entry and ready access to the splices as well as a sufficiency of fiber slack is highly desirable. Thus, in one type of prior art closure, the device has a modular construction comprising a plurality of tray-like members each adapted to retain and store at least one fiber. The trays are stacked on top of each other, and each is hinged separately at one end thereof to a carrier, which allows them to move relative to one another. Such an arrangement is complex and uneconomical for use in low count fiber situations although for high count arrangements, it is adequate.

In U.S. Pat. No. 4,927,227 of Bensel et al., there is shown a splice case arrangement which affords an added measure of protection to the optical fibers involved in the splices. That arrangement has a support member including a base for supporting an optical fiber breakout and a plurality of splice trays. The breakout allows a user to separate fibers into groups before they are routed to one of the trays. In another prior art closure, a tubular cover having a closed end and an open end is adapted to receive and be sealed to a cable termination assembly. The cable termination assembly includes cable entry facilities through which the cables to be spliced are routed. A support member extends from the cable entry facilities and has a free end disposed adjacent to the closed end of the cover. The support member includes a support base for supporting an optical fiber breakout and a plurality of optical fiber splice trays. On each tray is at least one organizing module which is capable of holding a plurality of optical fiber splices. Each module is capable of holding any of a plurality of splice types, such as fusion, and cleave, sleeve and leave splices. Additional modules may be added as needed. This and similar arrangements have enhanced storage capacity, which is ideal for high density applications. However, such an arrangement is larger than desired and supplies more storage capacity than is needed for low density applications such as fiber-in-the-loop (FITL) and other low density distribution and drop cables.

In most of the prior art arrangements, the emphasis is on adequate storage capacity and fiber protection, with space and ease of access being a secondary consideration. Although some of the foregoing patents, such as the Cobb et al. patent, make size, access, and cost important considerations, for some situations, such as CATV applications, still greater reductions in size, simplicity, and cost are needed.

SUMMARY OF THE INVENTION

The present invention is a splice closure arrangement which is designed to overcome the foregoing problems of prior art closures including the complexities thereof as well as the necessarily large sizes and the difficulty of accessing the splices contained therein. The invention in a preferred embodiment thereof is an optical fiber splice closure arrangement having a cover member comprising two substantially identical halves which, when fitted together form a closure having apertured end walls. Within the aperture of each of the end walls is a resilient grommet member through which the cable to be spliced passes. Mounted within the closure is a longitudinally extending spine member having at each end thereof a cable sheath grip assembly. A splice tray is mounted on the spine member between the sheath grip assemblies and functions as a fiber slack storage member as well as a holder for one or more splice holders mounted thereto. The combination of a single rigid member containing both cable gripping members and splice holders effectively eliminates any displacement of these components relative to each other resulting from twisting or other forces, and reduces the effect of any tensile threes that may occur in use.

The splice holders are grooved to receive and hold the splices, preferably fusion splices, at an angle to the axis of the spine member both to reduce the necessary width of the splice tray assembly and to facilitate orienting the fibers so that they do not have too small a bend radius. Each of the splice holders is grooved to receive the splices on one surface only, and the several holders are adapted to be stacked together so that the ungrooved surface of one holder overlies the grooved surface of the adjacent holder for substantially enclosing the splices contained within the grooves. Each grooved holder surface has an adhesive member, for example, on a portion of the surface so that the splices, once inserted in the grooves, are held in place, especially longitudinally. Up to eighteen (18) splices may be accommodated by the stacked splice holders, which is an unusually large number of splices in so compact a closure configuration. The splice tray has a transparent cover removably attached thereto which is contoured to have a recess which overlies the stack of splice holders. A resilient member is mounted within the recess and bears against the top most splice holder of the stack to apply pressure to the entire stack to hold it in place.

Where the splice closure is to be used with a cable having a metallic sheath, such as, for example, AT&T mini-LXE cable, grounding lugs are adapted to be gripped by the sheath grip assemblies. Each sheath grip assembly has a fixed portion attached to the spine at the end thereof and a separate movable plate member adapted to fit over the fixed portion. Matching lugs on the two portions insure room for the grounding lug when mini-LXE cable, for example, is being spliced. For non-armored types of cables, reversal of the plate member takes the lugs out of registry. In addition, slots in the movable plate assist in gripping the non-armored types of cables.

The splice closure of the invention to be described more fully hereinafter, is compact, simple, and economical both from the manufacturing standpoint and the installation and maintenance standpoint. The numerous features and advantages of the invention will be more fully understood from the following derailed description, read in conjunction with the accompanying drawings.

DETAILED DESCRIPTION

Figure 1:
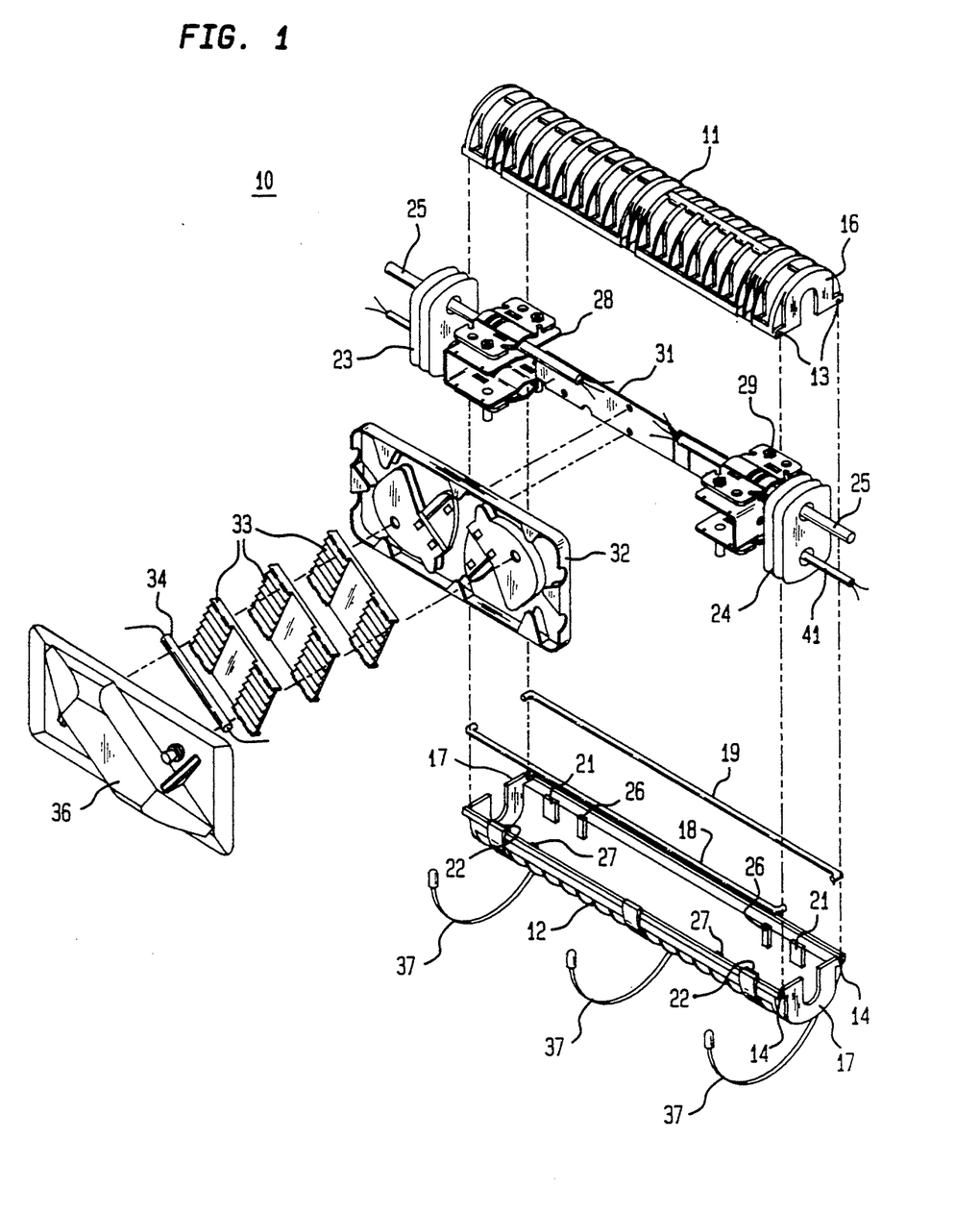
FIG. 1 is an exploded perspective view of the splice closure of the present invention.

The splice closure assembly 10 of the invention as shown in FIG. 1 comprises first and second mating shell members 11 and 12 of suitable insulating material, such as nylon, and each having longitudinally extending grooves 13,13 and 14,14 respectively, along the side edges thereof, and apertured end walls 16,16 and 17,17 respectively. First and second foam seal members 18 and 19, are adapted to fit within the grooves 13,13 and 14,14 to provide closure seals when the two shells 11 and 12 are clamped together. If desired, members 18 and 19 may be affixed within one pair of grooves such as grooves 14,14 by suitable adhesive material such as commercially available Avery Fastape-D ®. The end walls 16, 16 and 17,17 together with ribs 21 and 22 formed within the shells form a locating space for a pair of end seal grommets 23 and 24 through which the cable 25 to be spliced pass into the interior of the closure, as will be discussed more fully hereinafter. Also, formed within shells 11 and 12, spaced from ribs 21 and 22 are ribs 26 and 27 which, together with the ribs 21 and 22 respectively, define locating spaces for a pair of sheath grip assemblies 28 and 29, one of each of which is affixed at each end of a rigid backbone or spine member 31. Thus, as will be discussed more fully hereinafter, with the grommets 23 and 24 in place and with the spine member 31 and sheath gripping members 28 and 29 mounted thereto and fixed in place in the space between the ribs 21, 26 and 22, 27, the cables 25 are firmly gripped in a manner to resist any longitudinal stresses, i.e., tension stresses.

Removably affixed to spine member 31 is a splice tray 32 upon which are stacked a plurality of splice holders 33,33 oriented at an angle to the centerline of the enclosure assembly as will be discussed more fully hereinafter, each of which is adapted to hold six fusion splices 34. The splice tray and the stacked splice holders are covered by a detachable splice tray cover 36. After the cables 25 are spliced and the splices 34 are located within holders 33 mounted on splice tray 32 which is, in turn mounted on spine 31, and cover 36 is in place, the two shells 11 and 12 are clamped together by means of a plurality of flexible clamp bands 37,37 of the type commonly referred to as hose clamps, which are preferably made of stainless steel.

Figure 2:
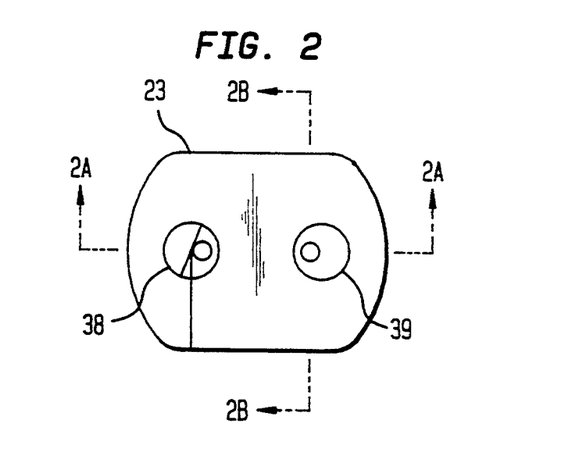
FIGS. 2, 2A, and 2B are, respectively, a plan view of the grommet of the splice closure, a sectional view along the line A—A of FIG. 2 and a sectional view along the line B—B of FIG. 2.
Figure 2A:
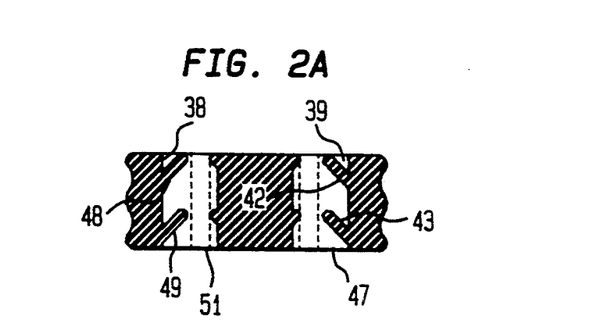
Figure 2B:
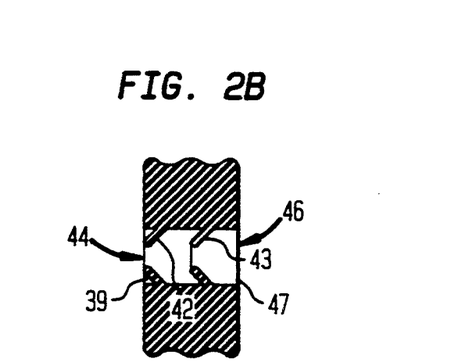

The grommet 23, which is identical to the grommet 24 is shown in detail in FIGS. 2, 2A and 2B. Grommets 23 and 24 are made of a suitable resilient material such as, for example, polyurethane and, as pictured in FIG. 2, each is shaped to fit within the recess space provided by 21 and 22 and the end walls 17,17 of the shells 11 and 12. Grommet 23, as shown in FIG. 2, has first and second apertures 38 and 39 for receiving the cable to be spliced and, for example, a jumper cable 41 also. Inasmuch as the cable 25 to be spliced is most important in describing the assembly 10, the remainder of the discussion will be directed to its relationship to grommet 23. Within the aperture 39 there are formed first and second sloped flexible flanges 42 and 43 which slope toward the cable entrance end 44 of grommet 23, and at the cable exit end 46 a web 47 closes the hole or bore 39. In practice, when a cable 25 is to be inserted through bore 39, the web 47 is slit or cut and the cable is forced through aperture 39 past sealing flanges 42 and 43 and exits through web 47. In the past, it has been the practice to mold grommets with open apertures therein and without the web 47. Unused apertures or bores are then plugged for sealing purposes by separate plugs forced into the open aperture. Such plugs are often misplaced or lost which results in some delay until substitute plugs can be formed. The grommet 23, on the other hand, functions as a sealing unit without the necessity of being plugged so long as the web 47 is intact. As best seen in FIG. 2A, aperture 38 also has resilient sealing flanges 48 and 49 and a web 51 and functions to seal to jumper cable 41, if used. Otherwise, web 51 functions as a seal for the interior of the closure 10. The grommets 23 and 24 are placed within the spaces in the shells 11 and 12 so that the webs 47 and 51 are adjacent the interior of the shells.

Figure 3:
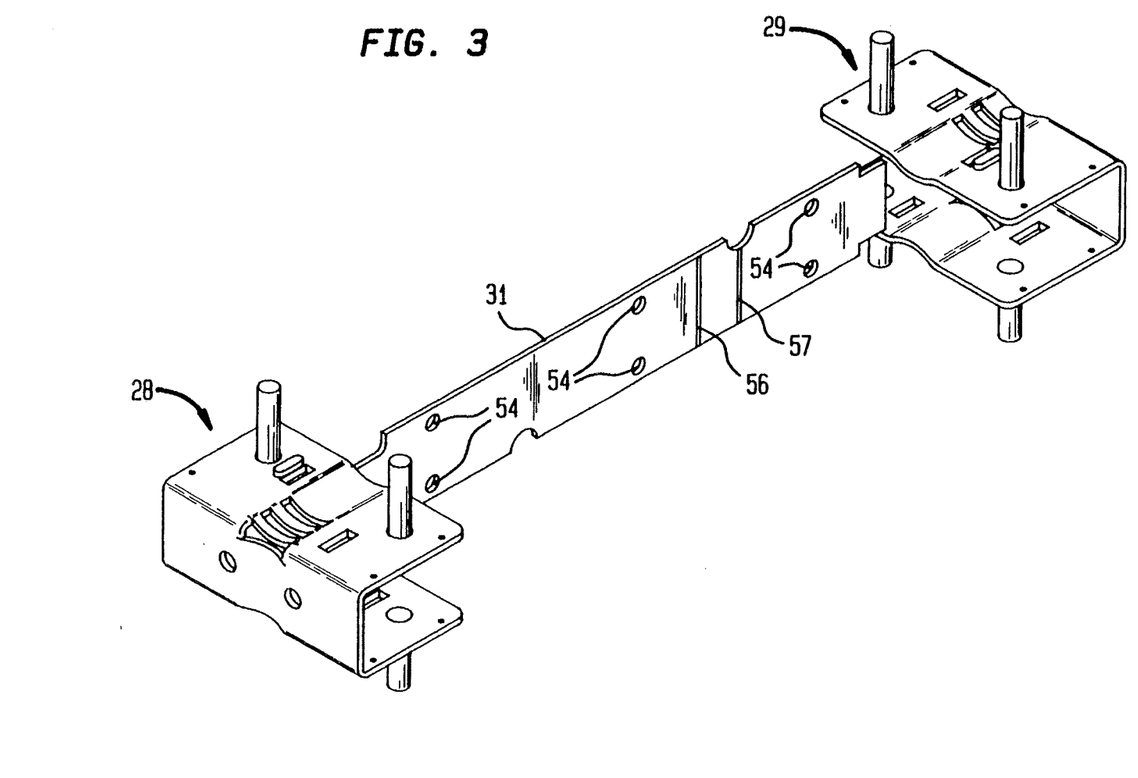
FIG. 3 is a perspective view of the splice or backbone member of the closure of the present invention with the sheath gripping members attached at each end thereof.
Figure 4:
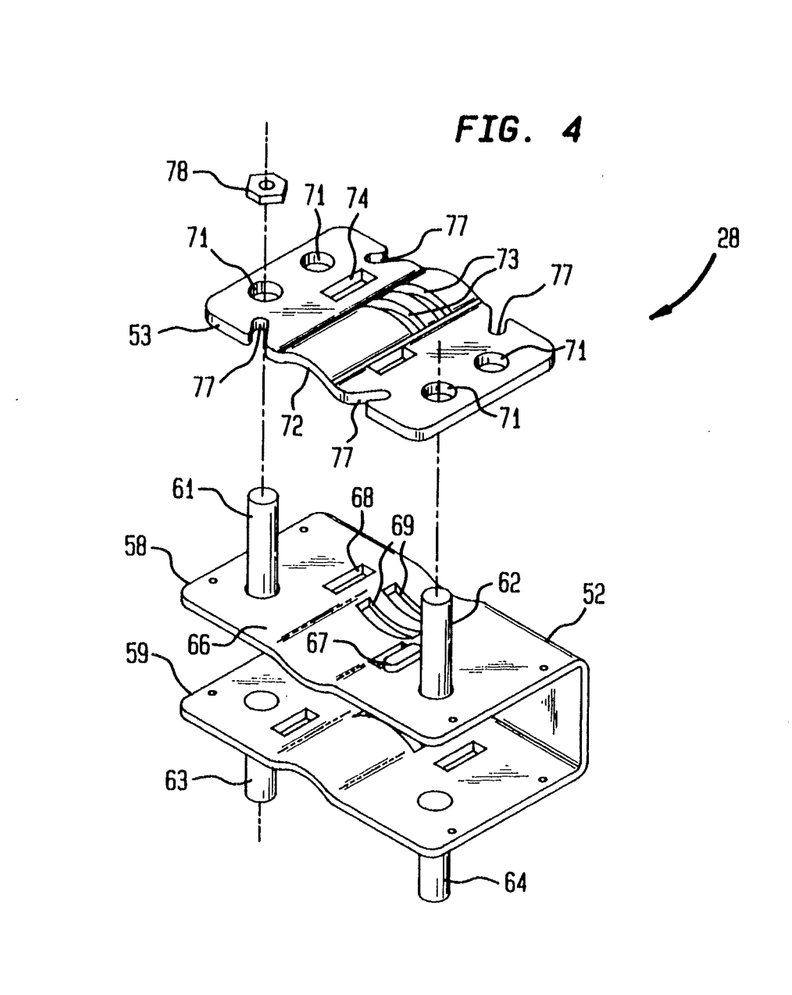
FIG. 4 is a perspective view of the two-part sheath gripping member assembly.

In FIG. 3, there is shown the spine member 31, which is made of a high strength, high conductivity material such as tin plated cartridge brass, for example. At either end of member 31 there is affixed, as by riveting, the fixed portion of a two part cable sheath grip 28 and 29, which are identical. As best seen in FIG. 4, sheath grip assembly 28 comprises a fixed portion 52 and a movable plate portion 53. Member 31 has a plurality of holes 54,54 drilled therethrough at spaced intervals for the purpose of removably mounting splice tray 32 thereon, as will be discussed more fully hereinafter. Members 28 and 29 are so dimensioned that they fit snugly into the spaces between ribs 21-26 and 22-27 and are restrained from moving longitudinally. Member 31 is also scored at 56 and 57 so that the portion therebetween may be broken out in those cases where direct electrical connection between members 28 and 29 is not desired.

Figure 5A:
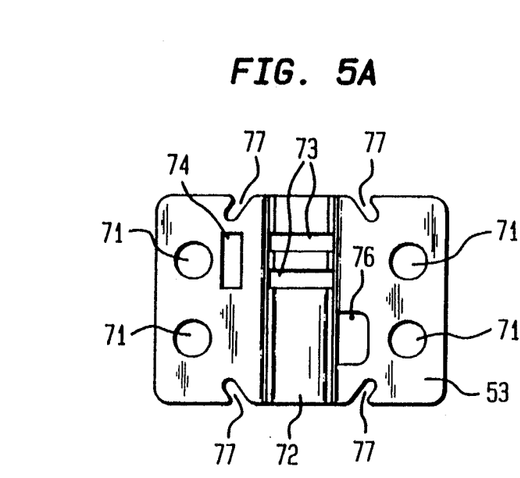
FIGS. 5A and 5B are, respectively, a plan view and an elevation view of the movable plate member of the sheath gripping assembly of FIG. 4.
Figure 5B:
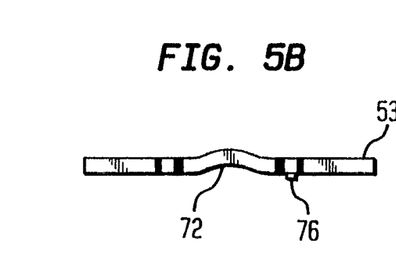

FIGS. 4, 5A and 5B depict the sheath grip assembly 28, which is identical to sheath grip assembly 29. Member 52 is adapted to be affixed to spine 31 at the end thereof, as shown in FIG. 3, and has a U-shaped configuration with the U lying on its side, thereby forming top plate 58 and bottom plate 59. Top plate 58 has extending therefrom first and second threaded studs 61 and 62, and studs 63 and 64 extend from bottom plate 59. Inasmuch as both top plate 58 and bottom plate 59 are substantially identical, only the configuration of top plate 58 will be described, with the understanding that the description also applies to bottom plate 59. Plate 58 has a centrally located depression or groove 66 extending therealong for receiving the cable 25 to be gripped. Between stud 62 and groove 66 is an upwardly projecting tab 67, and diagonally opposite tab 67, on the other side of groove 66 is a rectangular slot 68. Groove 66 also has a pair of transverse slots 69,69 extending thereacross. Movable plate member 53 has holes 71,71 spaced to accommodate studs 61 and 62 so that plate 53 may be placed directly over plate 58. Plate 53 has a groove 72 therein which is in registry with groove 66 when plate 53 overlays plate 58. Groove 72 also has transverse slob 73,73 corresponding to slots 69,69 in groove 66 of plate 58. Plate 58 also has a rectangular slot 74 on one side of groove 72, and a projecting tab 76, best seen in FIGS. 5A and 5B, diagonally across groove 72 from slot 74. Plate 53 also has thereon a plurality of notches 77,77 located as shown. Suitable fastening means, such as nuts 78,78, only one of which is shown, are used to clamp plate 53 to plate 58.

Figure 12:
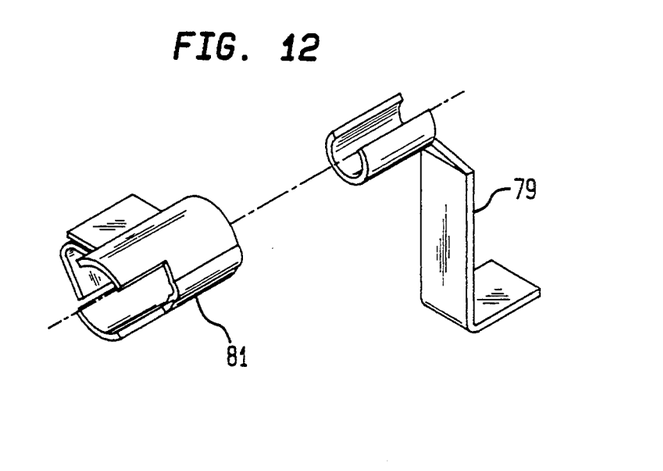
FIG. 12 is a perspective exploded view of a grounding lug assembly for use with the sheath gripping assembly of FIG. 4.

The splice closure 10 is designed primarily for use with AT&T mini-LXE (lightguide express entry) metallic cable, or AT&T TFOCA (tactical fiber optic cable) non-armored cable for military use. When mini-LXE cable is to be spliced, it is necessary to clamp the grounding lug 79 and clip 81, shown in FIG. 12 to the armored sheath. In this mode, the orientation of plate 53 relative to plate 58 is as shown in FIG. 4, and projecting tabs 67 and 76 butt against each other, thereby assuring room for lug 79 and clip 81 to grip the armored sheath of LXE cable and also to pinch clip 81 into tight engagement with the cable armor. LXE cable also is equipped with diametrically opposed strength members in the form of heavy duty wire. These members are bent back through the notches 77,77 and wrapped around the studs 61 and 62. The cable 25, in this case mini-LXE cable is contained within the grooves 66 and 72 and nuts 78 are tightened down to clamp the cable firmly in place.

On the other hand, when the soft sheathed TFOCA cable is to be gripped and spliced, plate 53 is turned 180° from the orientation shown in FIG. 4, so that tab 67 on plate 58 passes through slot 74 on plate 53, and tab 76 on plate 53 passes through slot 68 on plate 58. In this mode, when plate 53 is tightened down, the soft sheath on the cable bulges into the slots 69,69 and 73,73, thereby creating a firm grip on the cable that inhibits longitudinal movement of the cable 25.

Figure 6A:
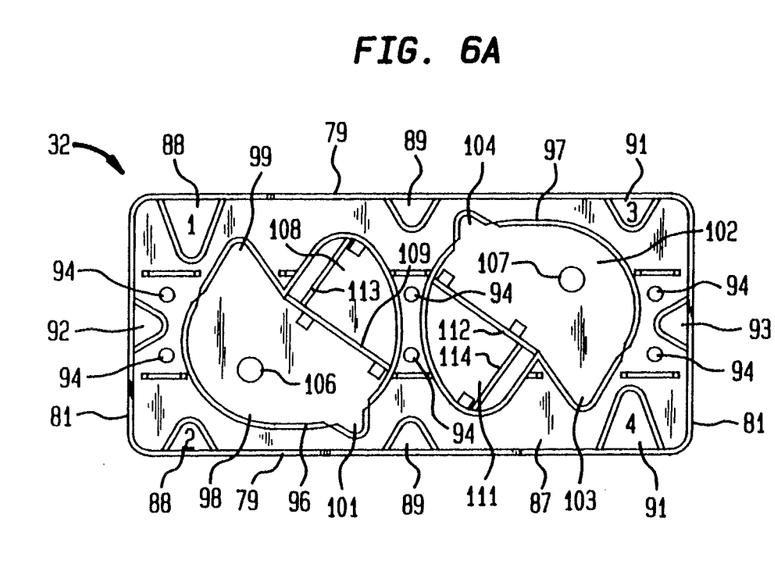
FIGS. 6A and 6B are, respectively, a plan view and a side elevation view of the splice tray of the closure assembly.
Figure 6B:
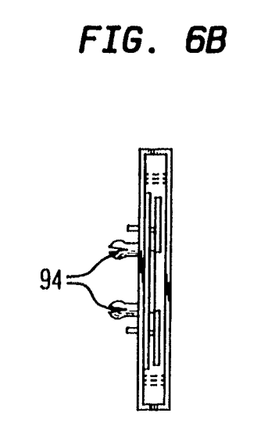
Figure 7:
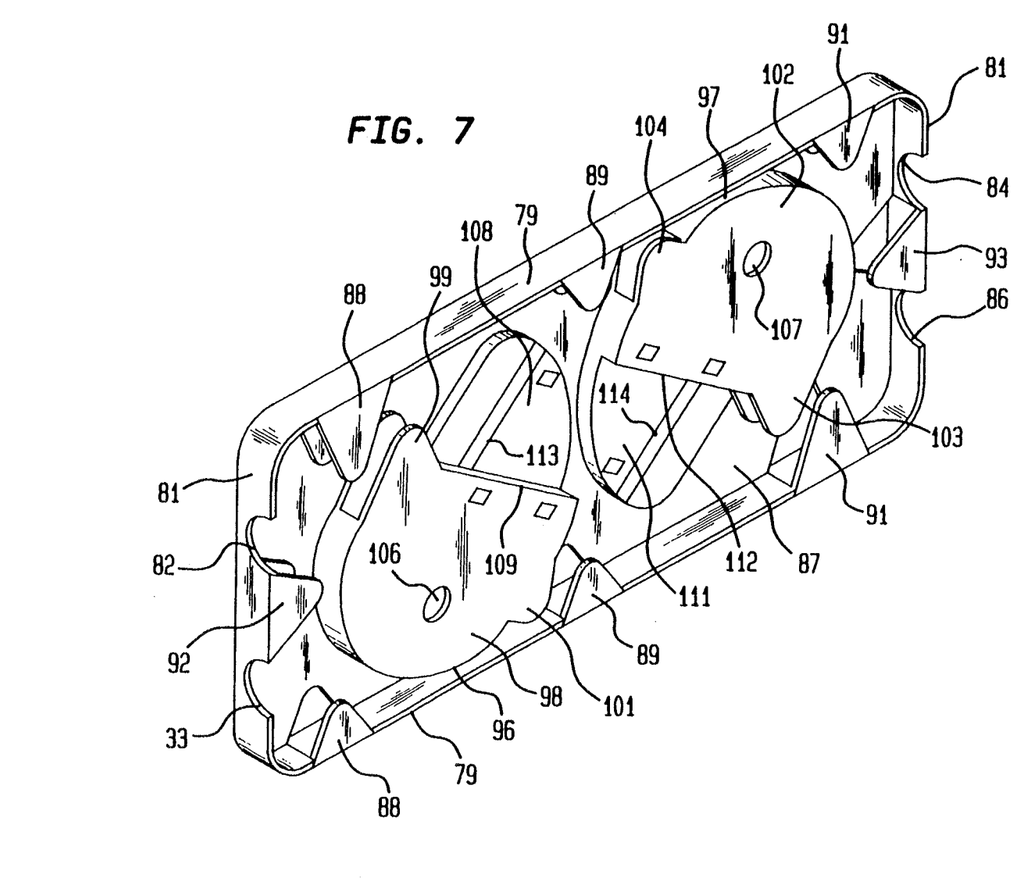
FIG. 7 is a perspective view of the splice tray.

The splice tray 32 of the present invention is shown in FIGS. 6A, 6B and 7. Tray 32 comprises a rectangular member of a suitable hard polycarbonate material having upstanding side walls 79,79 and end walls 81,81 which have openings 82,83 and 84,86 formed therein, and a floor 87. Each of the side walls 79 has a plurality of spaced tabs 88, 89 and 91 extending therefrom, as shown. As best seen in FIG. 6A, tabs 88,88 bear the numbers ①and ② and tabs 91,91 bear the numbers ③ and ④. Tabs 92 and 93 extend from end walls 81,81. All of the tabs form, with floor 87, retainer spaces for the individual optical fibers to be spliced. Extending from the bottom surface of floor 87 are a plurality of split retainer pins 94,94 which are adapted to snap into holes 54,54 in spine member 31 to mount splice tray 32 removably thereto.

First and second spaced hubs 96 and 97 are located on tray 32 as shown. Hub 96 has a top surface 98 from which retainer tabs 99 and 101 extend, and hub 97 has a top surface 102 from which retainer tabs 103 and 104 extend. A cover mounting hole 106 is drilled through top surface 98 and a cover mounting hole 107 is drilled through the top surface 102. Hub 98 has a second, lower surface 108 which forms a shoulder 109 with the remainder of hub 96, as best seen in FIG. 7 which is at an angle to the longitudinal axis of tray 32. In a like manner, hub 97 has a lower surface 111 which forms a shoulder 112 on hub 97 that is parallel to shoulder 109 and spaced therefrom. A retaining rib 113 at right angles to shoulder 109 extends from surface 108, and a retaining rib 114 similarly extends from surface 111. Shoulders 109 and 112 and ribs 113 and 114 define a rectangular area at an angle to the axis of tray 32 for containing a splice holder 33 and preventing movement thereof in the plane of the surfaces 108 and 111.

Figure 8:
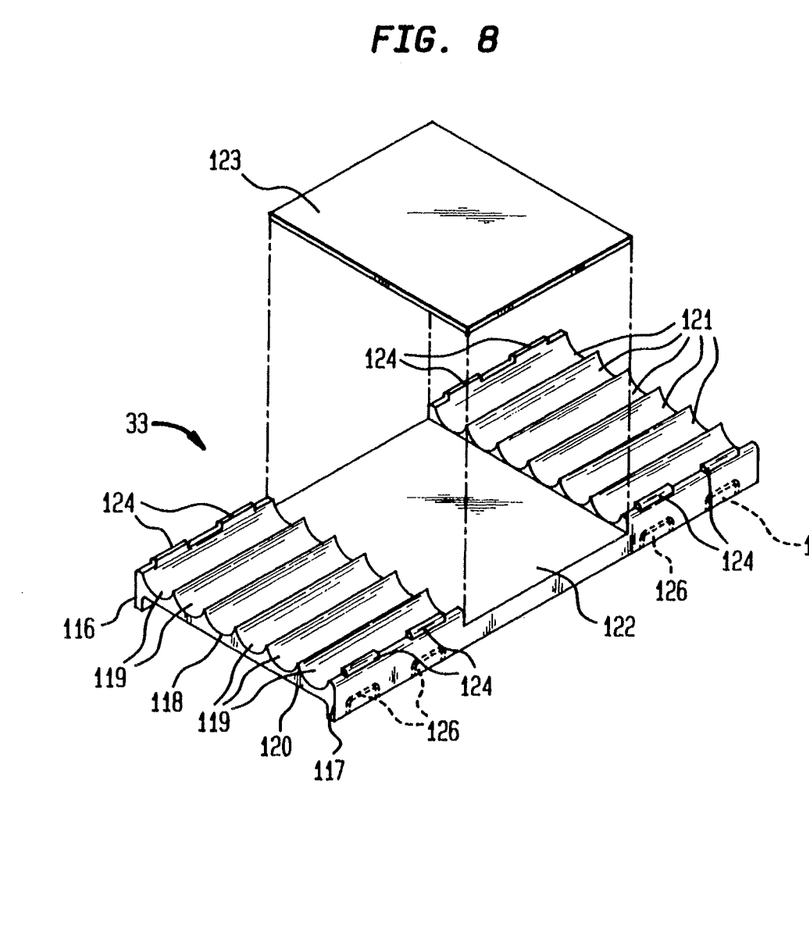
FIG. 8 is a perspective view of the splice holder for use with the splice tray of FIGS. 6A, 6B and 7.
Figure 9:
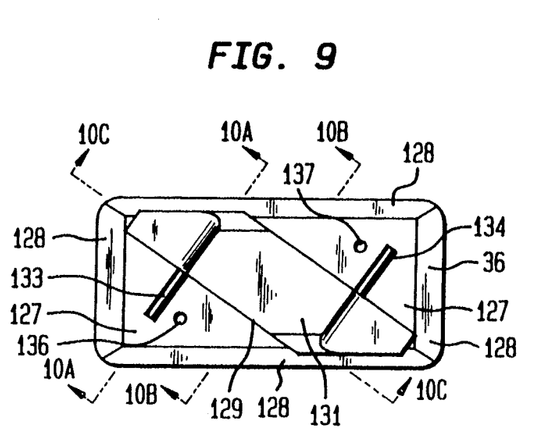
FIG. 9 is a plan view of the splice tray cover of the present invention.
Figure 10A:
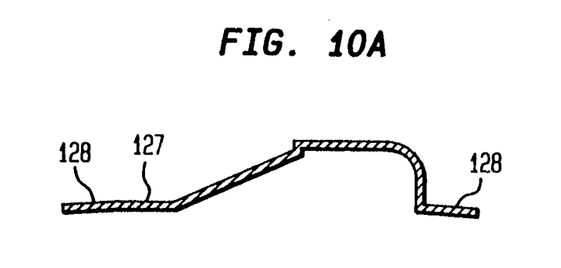
FIGS. 10A, 10B, and 10C are, respectively, cross sectional views of the cover of FIG. 9, taken along the lines of A—A, B—B and C—C of FIG. 9.
Figure 10B:
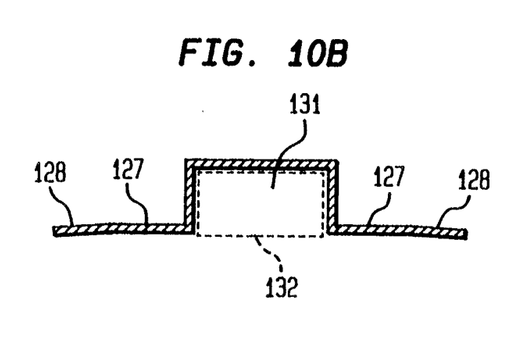
Figure 10C:
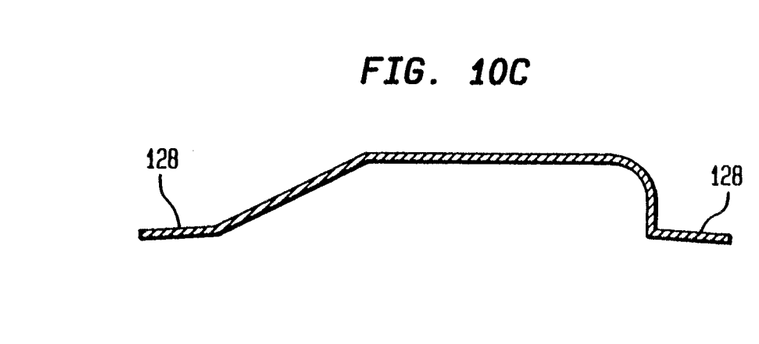
Figure 11:
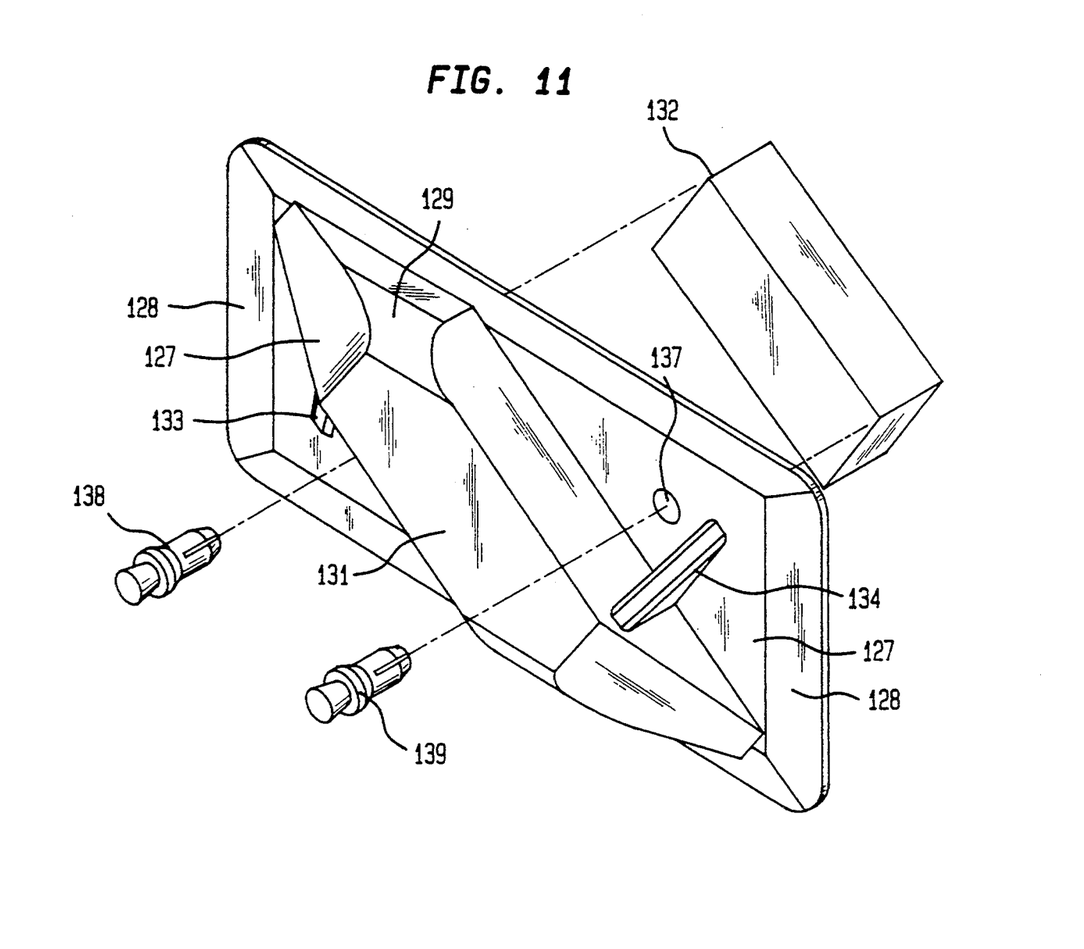
FIG. 11 is a perspective exploded view of the splice tray cover of FIG. 9 showing the component parts thereof.

In FIG. 8 there is shown a splice holder 33 designed to fit within the rectangular space formed in splice tray 32 by the ribs 113 and 114 and shoulder 109 and 112. Holder 33 has an H-shaped configuration having first and second upstanding leg portions 116 and 117 and a transverse member 118. The upper surface of member 118 has a first plurality of splice holding grooves 119, 119 and a second plurality of grooves 121,121 spaced from grooves 119 and collinear therewith. The space 122 between the two sets of grooves 119,119, and 121,121 contains an adhesive material 123 which may be sprayed or otherwise coated with the upper surface of member 118, or which may be a double-sided adhesive tape such as Avery Fastape-D ®. When the splices are placed in the grooves 119,119 and 121,121 they rest upon the adhesive 123 and are held in place thereby. The upper edges of leg portions 116 and 117 have formed thereon a plurality of upstanding locating tabs 124,124 and the lower edges of legs 116 and 117 have a plurality of recesses 126, 126 formed therein and dimensional to receive the tabs 124, 124 of the adjacent splice holder upon which holder 33 is placed. In this manner, the splice holders may be stacked together with the lowest one being held against movement by the space formed by the shoulders 109 and 112 and ribs 113 and 114 while the tabs 124,124 and recesses 126,126 prevent movement between the stacked splice holders. At the same time, the splices themselves are held in place by the grooves 119 and 121, the adhesive 123, and the underside 120 of the transverse member 118 of the holder immediately above the splices.

As pointed out in the foregoing, the splice holders 33,33 are oriented at an angle to the center line or axis of the splice tray to eliminate as much as possible unnecessarily sharp, i.e., small radius bends in the optical fibers leading to the splices held in the splice holders. Such an angular orientation is shown, for example, in U.S. Pat. No. 4,679,896 of Krafcik et al. The angular orientation also is less demanding of closure width, hence, it is possible to use a narrower closure, which is advantageous where the closure containing space is small, as in a pedestal installation.

With the splice tray 32 and splice holders 33 mounted on the spine member 31 several configurations for storing the fiber slack are possible without creating fiber bends that are too sharp. For example, if the feed cable fibers enter the tray 32 through opening 82 (location ①), for a straight cable to cable splice, the field cable fibers should enter at opening 86. Any fiber slack is stored by passing the feeder cable fibers from location ① to location ③, around hub 97, from location ④ to location ②, around hub 96 to the splice holder. The field cable fibers are routed in the same manner but in the opposite direction. When it is necessary, for whatever reason, to reverse dress a fiber, it is passed between the two hubs 96 and 97 in an S-shaped path while the other fiber of the splice can be passed directly from its opening, for example, opening 82, to the splice holder if there is no slack, or around the outside of the hubs as described heretofore.

It can be appreciated that the arrangement of two spaced hubs and angularly disposed splice holders make possible a number of fiber slack storage configurations without the fibers being bent to too small a radius. Multihub splice trays are known, but to applicants' knowledge, the prior art does not show the particular configuration of hubs and holders shown in FIGS. 6A, 6B, 7 and 8.

FIGS. 9, 10A, 10B, 10C and 11 show the configuration of the splice tray cover 36 which is preferably made of a suitable transparent plastic material such as, for example, transparent PVC. Cover 36 has a top fiat surface 127 with a slightly angled edge 128 extending around the perimeter thereof. The cover 36, which is rectangular in shape to conform to the shape of splice tray 32 has an angularly disposed raised portion 129 configured as shown in cross-section in FIGS. 10A, 10B, and 10C which forms a rectangular recess or chamber 131 which contains a rectangular block 132, shown in dashed lines in FIG. 10B. Chamber or recess 131 is dimensioned to contain a portion of the uppermost splice holder 33, and the block 132, which is of resilient foam material such as, for example, ether based poly-urethane foam, applies pressure to the stack of splice holders 33,33 when the cover is in place and mounted on the splice tray 32. The stack of holders 33,33 is thus held firmly from any movement in a vertical direction as well as in a horizontal direction. Strengthening fibs 133 and 134 add additional strength to the raised portion 129 and also prevent it from any tendency to bulge outward under pressure. Mounting holes 136 and 137 are drilled through surface 127 and are located to align with holes 106 and 107 in splice tray 32 when the cover 36 overlays the tray. Commercially available two-piece push-pull split pins 138 and 139 are used to hold cover 36 in place on tray 32 by being passed through holes 133 and 134 into holes 106 and 107 where they expand to hold the cover in place. When pulled away from cover 36, the pins release so that the cover 36 can be removed.

A preferred embodiment of the splice closure of the invention has been shown and described in detail in the foregoing. The closure is relatively small and compact, yet is capable of containing eighteen fusion type splices. It is relatively simple and affords ready access to the interior components so that repairs, replacements, or the addition of more splices or the removal thereof can be quickly accomplished. It affords ample storage for fiber slack without the necessity of too sharp bends in the fiber. The closure is economical both from a manufacturing standpoint and from the standpoints of installation and maintenance.

The features and principles of the present invention have been shown in an illustrative embodiment thereof. Various changes or modifications may occur to workers in the art without departure from these principles and features.

We claim:

1. An optical fiber cable splice closure comprising:

first and second cover members having apertured end walls and adapted to fit together to form a protective shell having a longitudinal axis;

a rigid elongated spine member having at least one end thereof a cable sheath gripping member affixed thereto;

means within said cover members for positioning said gripping members and said spine member oriented parallel to the axis of said shell to prevent longitudinal movement thereof;

sealing means located between at least one end of said spine member and an adjacent end wall through which cable to be spliced passes;

an elongated substantially planar splice tray member removably mounted on said spine member parallel thereto, said splice tray member having means for routing fibers to be spliced and/or storing excess fiber length;

splice holding means mounted on said splice tray member and oriented at an angle to said longitudinal axis of said shell, said splice holding means comprising a plurality of splice holders stacked together one on top of another, said splice tray member having means defining a space for said splice holding means and for preventing lateral movement of the splice holding means relative to said splice tray member; and splice tray cover means removably mounted to said splice tray member, said cover means having a recessed portion therein overlaying said stacked splice holders, and means within said recess for applying pressure to said stacked splice holders in a direction substantially perpendicular to the plane of said splice tray member.

2. An optical fiber cable splice closure as claimed in claim 1 wherein said elongated spine member has a cable sheath gripping member affixed to each end thereof.

3. An optical fiber cable splice closure as claimed in claim 2 wherein said means within said cover member for positioning said gripping member includes means adjacent each of said end walls for containing and holding said gripping members.

4. An optical fiber means as claimed in claim 1 wherein said sealing means comprises a resilient grommet member having at least one hole extending therethrough and a web member blocking said hole.

5. An optical fiber cable splice closure claimed in claim 1 wherein each of said splice holders comprises a substantially H-shaped member having first and second legs and a cross piece joining said legs.

6. An optical fiber cable splice closure as claimed in claim 5 wherein said cross piece has a plurality of splice holding grooves formed thereon.

7. An optical fiber cable splice closure as claimed in claim 6 wherein said grooves are in first and second spaced sets of grooves.

8. An optical fiber cable splice closure as claimed in claim 7 and further including adhesive material in the space between said first and second sets of grooves.

9. An optical fiber cable splice closure as claimed in claim 5 wherein said first and second legs each have first and second longitudinally extending edges, said first edges of said first one of said legs having a plurality of upwardly extending tabs spaced along the length thereof.

10. An optical fiber cable splice closure as claimed in claim 9 wherein said second edge of said first one of said legs has a plurality of recesses spaced along the length thereof.

11. An optical fiber cable splice closure as claimed in claim 10 wherein each of said recesses in said second edge is directly opposite a corresponding tab on said first edge.

12. An optical fiber cable splice closure as claimed in claim 11 wherein said second leg has a plurality of spaced tabs along the first edge thereof and a plurality of spaced recesses along the second edge thereof.

13. An optical fiber cable splice closure as claimed in claim 12 wherein said tabs on said first edge of said second leg are directly opposite corresponding recesses on said second edge of said second leg.

14. An optical fiber cable splice closure as claimed in claim 1 wherein said means for applying pressure to said stacked splice holders comprises a resilient member fitted in said recessed portion of said splice tray cover.

15. An optical fiber cable splice closure as claimed in claim 14 wherein said resilient material is ether based polyurethane foam.

* * * * *